(12) United States Patent
Czaja et al.

(10) Patent No.: US 7,006,828 B1
(45) Date of Patent: Feb. 28, 2006

(54) METHOD AND APPARATUS FOR PERFORMING CELL SELECTION HANDOFFS IN A WIRELESS COMMUNICATION SYSTEM

(75) Inventors: Stanislaw Czaja, Cardiff, CA (US); Hong Kui Yang, San Diego, CA (US)

(73) Assignee: VIA Telecom Co. Ltd., Grand Cayman (KN)

(*) Notice: Subject to any disclaimer, the term of this patent is extended or adjusted under 35 U.S.C. 154(b) by 488 days.

(21) Appl. No.: 10/056,819

(22) Filed: Jan. 24, 2002

Related U.S. Application Data

(60) Provisional application No. 60/268,335, filed on Feb. 12, 2001.

(51) Int. Cl.
*H04Q 7/20* (2006.01)
*H04Q 7/00* (2006.01)

(52) U.S. Cl. ............ 455/442; 455/437; 455/436; 455/438; 455/439; 455/525; 455/524; 370/328; 370/331

(58) Field of Classification Search ........... 455/442, 455/525, 436, 437, 438, 439, 443, 444, 524, 455/422.1; 370/331, 332, 328, 335
See application file for complete search history.

(56) References Cited

U.S. PATENT DOCUMENTS

| | | | | |
|---|---|---|---|---|
| 5,703,902 A * | 12/1997 | Ziv et al. | ............ | 455/228 |
| 6,151,502 A * | 11/2000 | Padovani et al. | ............ | 455/442 |
| 6,307,849 B1 * | 10/2001 | Tiedemann, Jr. | ............ | 370/335 |
| 6,381,458 B1 * | 4/2002 | Frodigh et al. | ............ | 455/442 |
| 6,507,572 B1 * | 1/2003 | Kumar et al. | ............ | 370/335 |
| 6,587,445 B1 * | 7/2003 | Mimura | ............ | 370/331 |
| 6,590,879 B1 * | 7/2003 | Huang et al. | ............ | 370/331 |
| 6,606,496 B1 * | 8/2003 | Salvarani et al. | ............ | 455/436 |
| 6,628,958 B1 * | 9/2003 | Kamel et al. | ............ | 455/522 |
| 6,757,536 B1 * | 6/2004 | Kim et al. | ............ | 455/436 |
| 6,810,252 B1 * | 10/2004 | Kwon | ............ | 455/436 |
| 2001/0019541 A1 * | 9/2001 | Jou et al. | ............ | 370/311 |
| 2001/0055969 A1 * | 12/2001 | Bonta et al. | ............ | 455/436 |

* cited by examiner

*Primary Examiner*—Sonny Trinh
*Assistant Examiner*—Huy Phan
(74) *Attorney, Agent, or Firm*—Martin J. Jaquez, Esq.; Jaquez & Associates

(57) ABSTRACT

A novel method and apparatus for performing cell selection handoffs in a wireless communication system is disclosed. The CSHO method and apparatus of the present invention determines which transmitters to temporarily disable or "gate off" during soft handoff procedures. The method and apparatus of the present invention monitors the channel conditions for all base stations in an active set of a selected mobile station and determines the relative strengths of base stations based on the monitored channel conditions. The method and apparatus of the present invention reduces interference to receivers in a wireless communication system. Specifically, the present invention temporarily disables, or "gates off" selected transmitters (e.g., base stations) during soft handoff procedures and thereby reduces interference to receivers that are not associated with the selected transmitters. Reducing this interference increases the overall voice and data capacity in a wireless communication system.

27 Claims, 4 Drawing Sheets

Service Area

Service Area

METHOD AND APPARATUS FOR PERFORMING CELL SELECTION HANDOFFS IN A WIRELESS COMMUNICATION SYSTEM

CROSS-REFERENCE TO RELATED PROVISIONAL APPLICATION

This application claims the benefit of U.S. Provisional Application No. 60/268,335, filed Feb. 12, 2001, entitled "System and Method for Improving Capacity in a Wireless System Having Soft Handoff", hereby incorporated by reference herein.

BACKGROUND OF THE INVENTION

1. Field of the Invention

This invention relates to wireless communication systems, and more particularly to methods for performing cell selection handoffs in a wireless communication system.

2. Description of Related Art

Wireless communication systems facilitate two-way communication between a plurality of subscriber mobile radio stations or "mobile stations" and a fixed network infrastructure. Typically, the plurality of mobile stations communicate with the fixed network infrastructure via a plurality of fixed base stations. Exemplary systems include such mobile cellular telephone systems as Code Division Multiple Access (CDMA) systems, Time Division Multiple Access (TDMA) systems, and Frequency Division Multiple Access (FDMA) systems. One objective of these digital wireless communication systems is to provide communication channels on demand between the mobile stations and the base stations in order to connect the mobile station users with the fixed network infrastructure (typically a wired-line system).

Exemplary CDMA Communication System

Mobile stations typically communicate with base stations using a duplexing scheme that allows for the exchange of information in two directions of communication. In most existing communication systems, transmissions from a base station to a mobile station are referred to as "forward link" transmissions. Transmissions from a mobile station to a base station are referred to as "reverse link" transmissions. Code Division Multiple Access, or "CDMA", systems are well known in the art. For example, one such system is described in U.S. Pat. No. 4,901,307, issued on Feb. 13, 1990 to Gilhousen et al., which is hereby incorporated by reference for its teachings of CDMA wireless communication systems.

Radio system parameters and call processing procedures for exemplary prior art CDMA systems are described in the TIA specification, entitled "Mobile Station-Base Station Compatibility Standard for Dual-Mode Wideband Spread Spectrum Cellular System," TIA/EIA/IS-95-A, published in May 1995 by the Telecommunications Industry Association, and is referred to hereafter as "IS-95A". An update and revision to IS-95A and J-STD-008 (PCS specification analogous to IS-95A) is the TIA/EIA/IS-95-B standard, which was published in March 1999 by the Telecommunications Industry Association (TIA), and is referred to hereafter as "IS-95B". The IS-95A and IS-95B specifications jointly specify second generation or "2G" CDMA systems. More recently, a third generation, or "3G" CDMA system, has been described in the TIA specification, and is entitled "cdma2000 Series", TIA/EIA/IS-2000-A. The TIA/EIA/IS-2000-A specification was published in March 2000 by the TIA, and is referred to hereafter as "IS-2000". The IS-95A, IS-95B and IS-2000 specifications are incorporated by reference herein for their teachings on CDMA communication systems.

FIG. 1 is a simplified depiction of a coverage area in a CDMA communication system having a service area comprising seven base stations, wherein the base stations are controlled by a single Mobile Telecommunication Switching Office (MTSO) 20. As shown in FIG. 1, a typical CDMA communication system comprises at least one mobile station and a plurality of fixed base stations geographically distributed over the system service area and controlled by the MTSO 20. A service area is defined as the geographical area within which a mobile station can remain and yet still maintain communication (i.e., maintain a valid radio link) with the CDMA communication system. Each base station provides communication services to a fixed area within the service area. The service area is known as the base station "coverage area". When a mobile station is within a base station's coverage area, the base station is able to provide communication services to and from the mobile station. Base stations that provide service to a mobile station are also known as "serving" base stations. The MTSO 20 coordinates all of the switching functions between the base stations, mobile stations, and other communications systems (e.g., a Public Service Telephone Network or satellite communication system).

Communication between base stations and mobile stations is established using a negotiation process that is initiated upon call origination. The serving base station begins the negotiation process by assigning a selected one of its available forward traffic channels to the mobile station and thus establishes a forward link with the mobile station. The mobile station then establishes a reverse link with the serving base station. Once communication is established between a serving base station and a mobile station, "pilot" channels emitted by each base station are used by the mobile station to identify the base station coverage area in which the mobile station belongs. The mobile station also uses the pilot channels to determine the quality of the radio link between the mobile station and the base station. Specifically, each base station transmits an unmodulated pilot channel on a predetermined frequency that aids the mobile stations in detecting signals and measuring signal strengths of nearby base stations.

CDMA Handoffs

CDMA handoffs occur when a mobile station moves from the coverage area of its active base station to the coverage area of a new base station. In typical CDMA systems, a mobile station maintains a list of available base stations for providing communication services to the mobile station. Normally, the mobile station communicates with base stations that have strong signals. The mobile station receives the pilot signals and determines which pilot signals are the strongest. A "searcher" unit in the mobile station commonly performs these signal detection and strength measurement functions.

The results of the searcher function are reported to the current (i.e., the active) base stations. The base station then instructs the mobile station to update a list of available base stations that are maintained by the mobile station. The list is sub-divided into three operative sets—an "active set", a "candidate set", and a "neighbor set". The active set contains a list of the base stations with which the mobile station is currently communicating. The candidate set contains a list of base stations that may move into the active set. The neighbor set contains a list of base stations that are being monitored, albeit on a less frequent basis.

As the mobile station moves and its currently active base station signal weakens, the mobile station must access a new base station. Based upon the results of the searcher function, and the instructions received from the base station, the mobile station updates its sets, and communicates with a different base station(s). In order for communication transmissions to appear seamless to the user of the mobile station (a highly desirable goal), the communication link must be "handed off" to the next base station. A handoff occurs when a mobile station moves across a "boundary line" from a first serving base station coverage area to a second base station coverage area. The communication system "hands off", or "hands over", or transfers service from the first serving base station to the second base station, also known as the "target" base station. A handoff also occurs when a single base station utilizes multiple frequency channels and switches communication between frequency channels. Each pilot channel is identified by a pseudo-random noise (PN) sequence offset and a frequency assignment. Thus, each pilot channel is uniquely identified with a base station that transmits the pilot channel. Thus, the pilot channels aid the mobile stations in performing handoffs between base stations.

Referring again to FIG. 1, each base station services a separate coverage area, roughly approximated and represented by a hexagon, and communicates using a specific frequency, a frequency one ($F_1$) or a frequency two ($F_2$). Examples of wideband channels used by CDMA systems include the well-known Cellular (800 MHz) and PCS (1900 MHz) bands. Other wideband channels can be used without departing from the scope or spirit of the present invention. In the exemplary CDMA system of FIG. 1, a first base station 12, located approximately in the middle of a Service Coverage Area One, communicates on a first frequency $F_1$. A mobile station 10 is located in the Coverage Area One and therefore is serviced by the first base station 12. When the mobile station 10 moves from the Coverage Area One to a Coverage Area Two, it performs a handoff procedure from the first base station 12 (the serving base station) to a second base station 14 (the target base station). Thus, the moved mobile station 10' is thereafter serviced by the second base station 14.

There are two basic types of handoffs in CDMA systems: "hard handoffs" (HHO) and "soft handoffs" (SHO). As is well known, a "soft handoff", or "Make-Before-Break" handoff, is a handoff procedure in which the mobile station initiates communication with a target base station without interrupting communication with a serving base station. Because mobile stations typically include only one transmitter, soft handoffs typically are only used between base stations with CDMA Channels having identical frequency assignments. Referring again to FIG. 1, a soft handoff procedure is performed when the mobile station 10 travels from a first Coverage Area One to a third Coverage Area Three because the base station 12 and a third base station 16 have identical frequency assignments, $F_1$ as shown in FIG. 1.

A "hard handoff" is defined as a handoff in which a mobile station initiates communication with a target base station after a momentary interruption in communication with a serving base station. Hard handoffs are also commonly referred to as "Break-Before-Make" handoffs. A hard handoff is typically used when the serving base stations and the target base stations use differing CDMA channel frequency assignments. As shown in FIG. 1, the first base station 12 uses a first frequency $F_1$ and the second base station 14 uses a second frequency $F_2$. A hard handoff is performed when the mobile station 10 travels from the Coverage Area One to the Coverage Area Two ($10^1$) because the first base station 12 and the second base station 14 transmit and receive using different frequencies, specifically, using $F_1$ and $F_2$, as shown in FIG. 1.

A hard handoff can also occur when a single base station uses multiple frequency channels and switches communication between its frequency channels. For example, a single base station hard handoff can occur between sectors associated with a single base station. The present invention addresses problems associated with the multiple base station scenario, and thus, the single base station scenario is not described in great detail herein. However, those skilled in the art shall recognize that the present invention can be utilized equally as well in a single base station scenario.

During a hard handoff operation, the radio link is momentarily interrupted because, as described above, a typical mobile station includes only one transmitter, and therefore, a typical mobile station can demodulate only one frequency at a time. Thus, switching from the CDMA channels of the serving base station (operating, for example, at a first frequency $F^1$), to the CDMA channels of the target base station (operating, for example, at a second frequency $F^2$), produces a momentary interruption in the continuity of the radio link between the mobile station and the base stations.

Disadvantageously, interference to the receivers (e.g., mobile stations) in wireless communication systems (e.g., CDMA communication systems) is increased during a SHO because multiple base stations maintain transmissions during a SHO. Prior art methods attempting to overcome the increased interference problem that is associated with multiple base station transmissions during SHO have several disadvantages. First, these methods are not capable of selectively gating (i.e., shutting off) base stations during selected time intervals. Specifically, these methods cannot gate off weak, unnecessary (i.e., base stations that are not necessary to achieve a desired QoS) and excess base stations. Excess base stations are defined as base stations that exceed the physical limitations of a receiver (i.e., the number of demodulation fingers in a receiver). For example, a receiver having four demodulation fingers is physically limited to demodulating signals from a maximum of four selected base stations, and thus base stations other than the four selected base stations are excess base stations. Second, communication systems utilizing prior art methods cannot mitigate short-term fading problems.

Therefore, a need exists for a method and apparatus for reducing interference during SHO to receivers in wireless communication systems. Such a method should increase the voice and/or data capacity in wireless communication systems. In addition, the inventive method should be able to selectively gate off base stations (e.g., weak, unnecessary and excess base stations) during selected time intervals. Further, the method and apparatus should be able to reduce or minimize short-term fading problems. The present invention provides such a method and apparatus for performing cell selection handoffs in wireless communication systems.

SUMMARY OF THE INVENTION

The present invention is a novel method and apparatus for cell selection handoffs (CSHO) in a wireless communication system. The method and apparatus of the present invention determines which transmitters to gate off during soft handoff (SHO) procedures. The method and apparatus of the present invention monitors channel conditions for all base stations in an active set and determines the relative strengths of base stations based on these channel conditions. The present invention can utilize any one of several embodiments to perform the inventive CSHO procedures. For example, the present invention can utilize either a "voice only" or a "voice and data" Cell Selection Handoff (CSHO) mode of operation.

The method and apparatus of the present invention reduces the interference during SHO to other receivers in wireless communication systems. Specifically, the present invention gates off selected transmitters (e.g., base stations) during a soft handoff to a receiver (e.g., mobile station), and thus reduces the potential interference to other receivers. By reducing potential interference to these other receivers (i.e., by gating off base stations associated with weak received signals in a mobile station), voice and/or data capacity is increased without loss of performance in the wireless communication system, while maintaining a desired QoS.

The details of the embodiments of the present invention are set forth in the accompanying drawings and the description below. Once the details of the invention are known, numerous additional innovations and changes will become obvious to those skilled in the art.

BRIEF DESCRIPTION OF THE DRAWINGS

Like reference numbers and designations in the various drawings indicate like elements.

DETAILED DESCRIPTION OF THE INVENTION

Throughout this description, the preferred embodiment and examples shown should be considered as exemplars, rather than as limitations to the present invention.

The method and apparatus of the present invention reduces the interference during SHO to other receivers in wireless communication systems. Specifically, the present invention gates off selected transmitters (e.g., weak, unnecessary and excess base stations) during a soft handoff to a receiver (e.g., mobile station), and thus reduces the potential interference to other receivers. By reducing potential interference to these other receivers (i.e., by gating off base stations associated with weak received signals in a mobile station), voice and/or data capacity is increased without loss of performance in the wireless communication system, while maintaining a desired QoS.

An important function of the cell selection handoff (CSHO) method and apparatus of the present invention is identifying the transmitters that should be disabled or "gated off" during soft handoff (SHO) operations. In an exemplary CDMA embodiment, the method of the present invention identifies a single strongest base station, or a set of relatively strong base stations, in a mobile station active set. The method then gates off selected base stations in the mobile station active set based on the strongest base station or set of relatively strong base stations when an SHO is performed.

The inventive cell selection handoff method and apparatus uses an innovative base station selection process. In accordance with the present invention, the method monitors channel conditions for all base stations in an active set and determines the relative strengths of base stations based on the monitored channel conditions. Base stations having relatively good channel conditions are considered to be "strong" base stations. In contrast, base stations having relatively bad channel conditions are considered to be "weak" base stations. The present invention determines channel conditions based on various parameters such as carrier-to-interference ratios (C/I), signal-to-noise ratios (SNR) and $E_b/N_t$ values.

The present inventive method and apparatus is intended for use in CDMA communication systems. An exemplary CDMA communication system adapted for use in the present cell selection method and apparatus is described in more detail below. However, as those of skill in the wireless communications art shall appreciate, any convenient communication system can be used to practice the present invention provided that mobile stations are capable of performing soft handoffs, and provided that the mobile stations are capable of gating off selected base stations during selected time intervals. The present invention can be used in almost any wireless communication system where it is desirable to increase overall system capacity.

Figure 1:
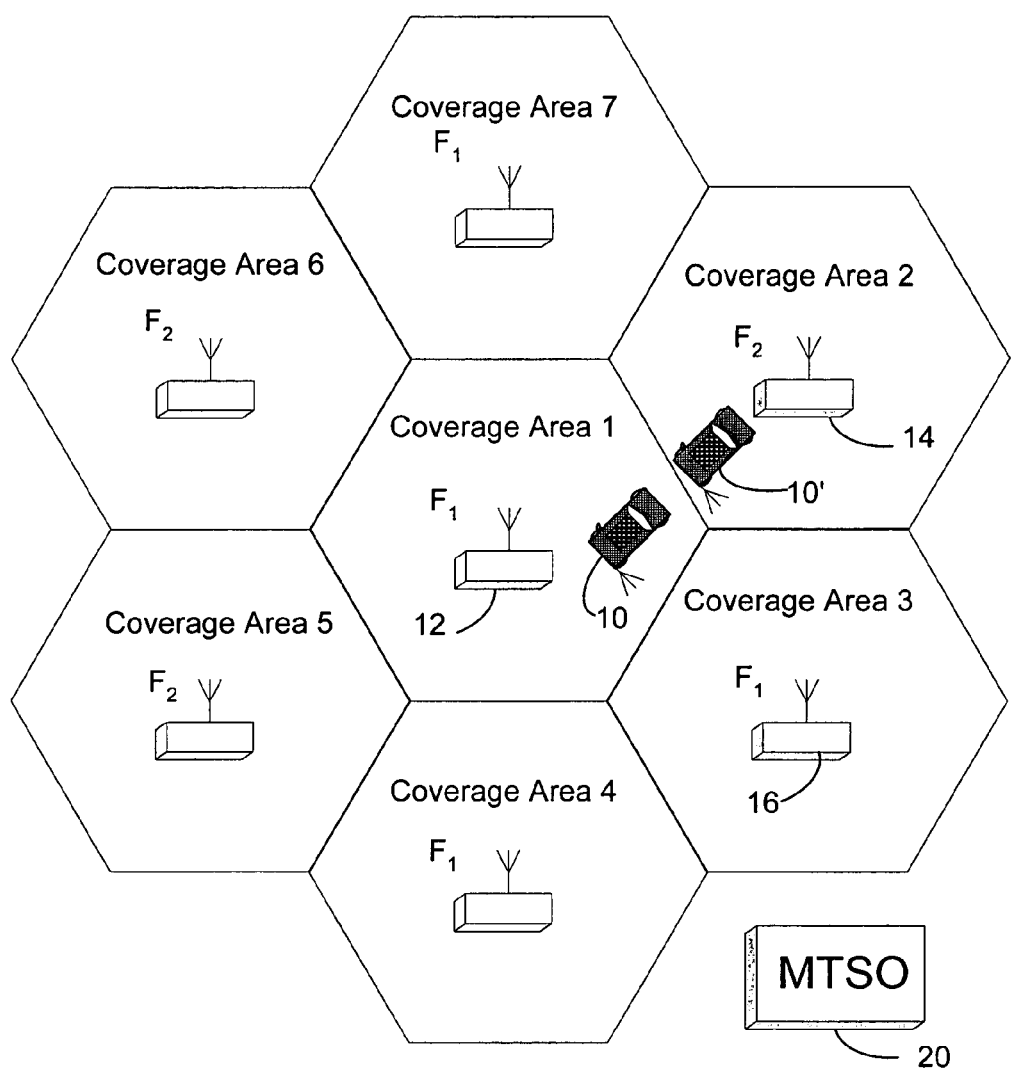
FIG. 1 shows an exemplary wireless communication system that can be adapted for use in the present invention.

An Exemplary CDMA Communication System Adapted for use with the Present Cell Selection Handoff Method and Apparatus The present inventive method and apparatus is intended for use in CDMA wireless communication systems. However, the system description provided herein is not meant as a limitation to the present invention as the invention can be used in any wireless communication system where soft handoffs are performed. FIG. 1 shows an exemplary CDMA communication system that can be used to practice the present cell selection handoff method and apparatus. As shown in FIG. 1, the exemplary CDMA communication system typically includes a mobile station 10 and a mobile telecommunications switching office (MTSO) 20 controlling a plurality of base stations 12, 14, 16, etc. An exemplary prior art CDMA communication system is described in more detail in the incorporated patent, U.S. Pat. No. 4,901,307. The mobile station 10 should be capable of tuning to the carrier frequency and measuring the strength of signals received from the base stations in the system.

Figure 2:
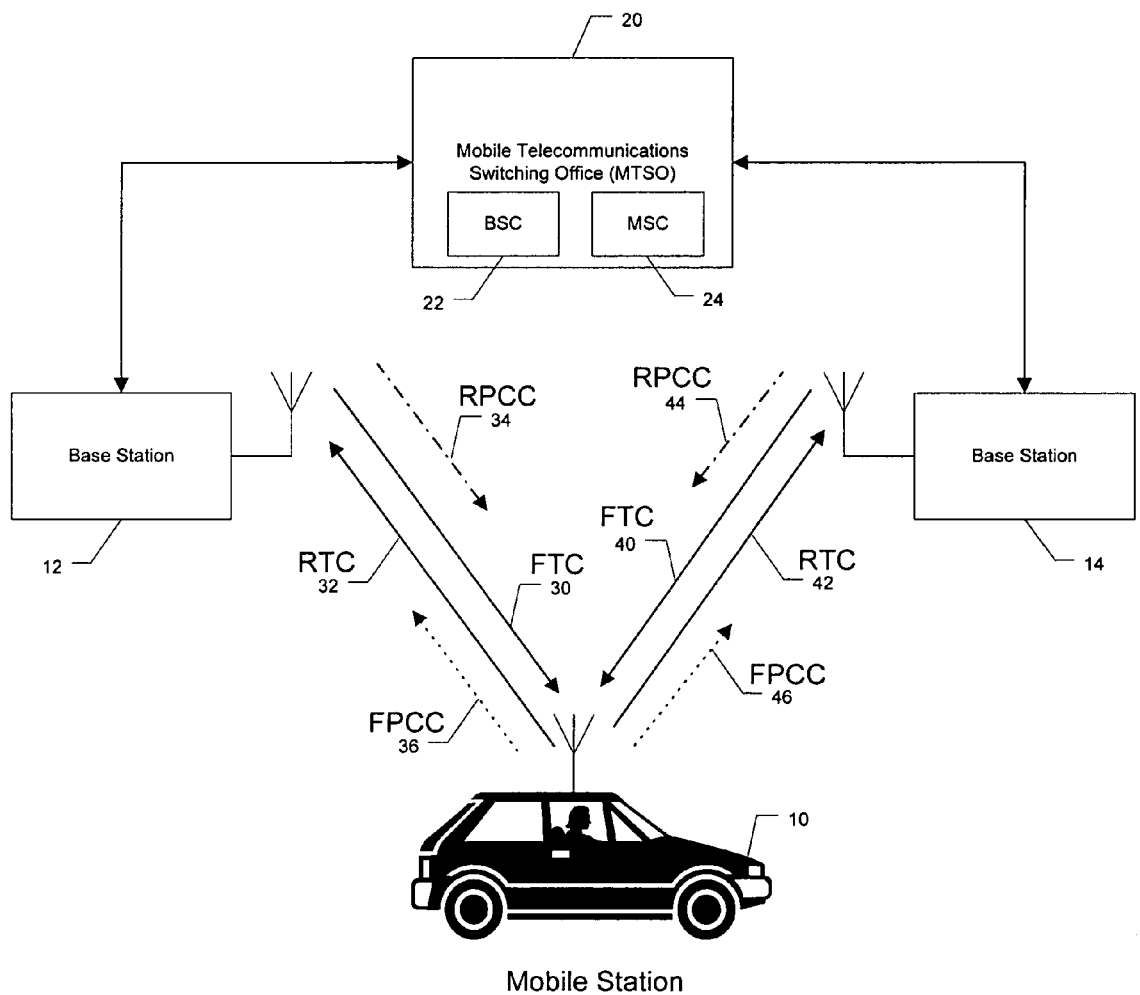
FIG. 2 shows an exemplary wireless communication system adapted for use with the present invention.

FIG. 2 shows an exemplary CDMA communication system adapted for use with the present invention. As shown in FIG. 2, the mobile station 10 is typically disposed on or within an automobile. However, this is not meant to be a limitation to the present invention. For example, the mobile station 10 may be disposed within a handheld unit, headset unit, or any other mobile station configuration well known in the wireless communications art. Referring again to FIG. 2, the mobile station 10 communicates with a base station 12 or a base station 14 depending upon which base station is currently the "serving" base station. Although FIG. 2 depicts only two base stations, the mobile station 10 can monitor more than two base stations. For example, in one embodiment, the active set of the mobile station 10 comprises five base stations.

As shown in FIG. 2, the mobile station 10 receives and transmits data over a radio link to an associated and corresponding serving base station. When the base station 12 is the serving base station for the mobile station 10, the mobile station 10 receives data via a forward traffic channel (FTC)

30 and transmits data via a reverse traffic channel (RTC) 32. When the base station 14 is the serving base station, the mobile station 10 receives data via a forward traffic channel (FTC) 40 and transmits data to the base station 14 via a reverse traffic channel (RTC) 42. A Mobile Telecommunications Switching Office (MTSO) 20 controls the transmission of the mobile station 10 and the base stations 12 and 14. The MTSO 20 includes a Base Station Controller (BSC) 22 subsystem and a Mobile Station Controller (MSC) 24 subsystem. The BSC 22 controls all of the base stations associated with the MTSO 20. Similarly, the MSC 24 controls all of the mobile stations associated with the MTSO 20.

As noted above, the exemplary CDMA communication system adapted for use with the present cell selection handoff method and apparatus is capable of disabling, or "gating off" selected base stations (i.e., disabling or temporarily shutting off transmissions from selected base stations) during selected time intervals. Time intervals comprise power control group (PCG) time slots having specified durations. For example, in an IS-2000 system, PCG time slots have a duration of 1.25 ms. Those skilled in the wireless communication art shall recognize that the PCG time slot is exemplary only, and that different time intervals can be utilized with the present invention without departing from its spirit or scope. PCG time slots are defined as intervals of time during which power control group data is transmitted. The exemplary CDMA communication system should also be capable of measuring at least one (or perhaps all) of the following values associated with the base station transmissions: carrier-to-interference ratios (C/I), signal-to-noise ratios (SNR) and $E_b/N_t$. The present inventive method is now described in more detail below.

Cell Selection Handoff (CSHO) Method of the Present Invention

The cell selection handoff method of the present invention determines which transmitters to temporarily gate off during soft handoffs (SHO). The present invention is described in the context of the above-described exemplary CDMA communication system. However, those skilled in the wireless communication arts shall recognize that this characterization is exemplary only and that any communication system that utilizes soft handoffs can be used with the present invention without departing from the scope or spirit of the invention.

The present inventive cell selection handoff method is summarized as follows:

(a) measure the signal strength of each base station in the active set of a selected mobile station;

(b) select a desired set of base stations from the active set that can provide the minimum amount of received power necessary to satisfy a desired QoS.

(c) disable or "gate off" base stations in the active set other than the desired set of base stations determined in step (b); and (d) perform a soft handoff operation with the desired set of base stations.

In accordance with step (a) above, the present inventive method monitors channel conditions for all base stations in an active set of a selected mobile station and determines the relative strengths of the base stations based upon the monitored channel conditions. Base stations with relatively "good" channel conditions are referred to as "strong" base stations. Conversely, base stations with relatively "bad" channel conditions are referred to as "weak" base stations. The present invention classifies the channel conditions based upon various parameters and thereby determines the relative strengths of the base stations. Step (a) sorts the relative strengths of the base stations to identify strong base stations.

In one embodiment, the method identifies the strong base stations on a frame-by-frame basis (i.e., the method selects strong base stations during each frame). The method can also require that the strong base stations have a combined or individual signal strength greater than a predetermined threshold. Some exemplary implementations of the step (a) above of the present inventive method are now described in more detail.

In a first embodiment of step (a), the inventive method utilizes carrier-to-interference ratios (C/I) to determine and classify the channel conditions. In accordance with this embodiment, the method continuously measures the C/I ratios of all base stations in the active set of a selected mobile station. The method selects the base stations with the best Signal-to-Nose Ratio (SNR) as the strong base stations. The SNR of the selected base stations (BSs) must satisfy the mobile station (MS) target $E_b/N_t$ that is necessary to achieve a desired quality of service (QoS).

In a second embodiment, the inventive method uses received (Rx) pilot $E_c/I_o$ measurements of all base stations in an active set of a selected base station to classify and determine channel conditions. In accordance with this embodiment, the BSs having the strong pilot $E_c/I_o$ measurements are classified as strong BSs.

In a third embodiment, the inventive method uses Rx pilot $E_c/I_o$ measurements of all base stations in an active set to classify and determine channel conditions. In accordance with this embodiment, the method measures and averages the pilot $E_c/I_o$ measurements to remove any uncertainties (e.g., uncertainties caused by fading and fluctuation). Averaging can be implemented in hardware or software using a filter (e.g., IIR and FIR filters). The BS having the strongest pilot $E_c/I_o$ measurements is selected as the strongest BS. Similarly, BSs having strong pilot $E_c/I_o$ measurements are selected as strong BSs. In this embodiment, the method selects the strongest base station in the active set of base stations on a frame-by-frame basis. In another embodiment, the method selects the strongest base station on a PCG-by-PCG basis.

In accordance with the step (b) of the present inventive method, the method selects a desired set of base stations from the active set that can provide the minimum amount of received power necessary to satisfy a desired QoS. In an exemplary embodiment, the method selects only one base station (e.g., the strongest base station) for the desired set of base stations because that base station alone can provide the minimum amount of received power necessary to satisfy a desired QoS. In another exemplary embodiment, the method selects more than one base station (e.g., two strong base stations) for the desired set of base stations.

In accordance with the step (c) of the present inventive method, selected base stations are temporarily disabled or gated off based upon the desired set of base stations identified in step (b). In an exemplary embodiment, with the exception of the strongest base station, all base stations in the active set of a selected mobile station are gated off. In another exemplary embodiment, all base stations except for a set of strong base stations are gated off.

In accordance with step (d) of the present invention, the method performs a soft handoff. In an exemplary embodiment, the step (d) further includes the step of enabling, or "gating on" selected base stations in the active set of the selected mobile stations after the soft handoff is performed. Exemplary means of performing the present inventive method are now described.

The method of the present invention can perform the steps (a), (b), (c) and (d) using various means for accomplishing these functions. In an exemplary means, for example, a mobile station performs measurements and identifies the strongest base station as described in the step (a). The selected mobile station transmits information regarding the step (b) (i.e., which base stations are to be gated off) to base stations in its active set via a feedback channel. The feedback channel must have a low latency (i.e., a relatively short delay). In one embodiment, the feedback channel has a length of 2 PCG or 400 Hz. In accordance with the steps (b), (c) and (d) of the inventive method, selected base stations are temporarily disabled or "gated off". An SHO is then performed using any conventional means.

The exemplary CSHO embodiment of the present invention can operate in either a "voice only" or "voice and data" CSHO mode of operation. In a voice only mode, the exemplary CSHO embodiment of the present invention communicates only voice information, rather than voice and data information. In a voice and data mode, the exemplary CSHO embodiment of the present invention communicates both voice and data information. The voice and data mode of operation can use either packet data, circuit switched data or a combination of both.

Figure 3:
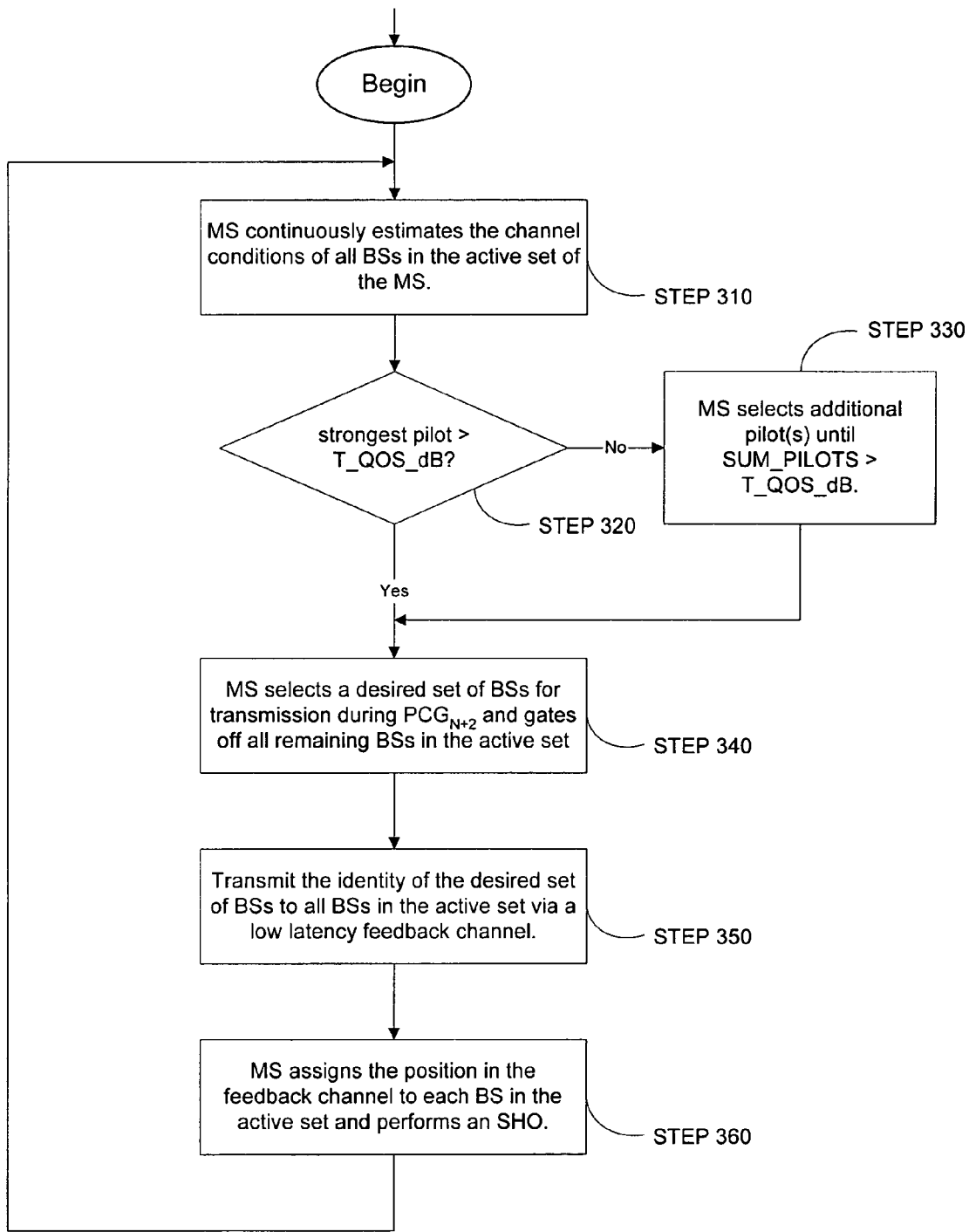
FIG. 3 is a flowchart of a method for performing a "voice only" mode Cell Selection Handoff (CSHO).

FIG. 3 is a flowchart of the exemplary CSHO method of the present invention. As shown in the FIG. 3, the exemplary CSHO method begins at a STEP 310 whereat a mobile station (MS) continuously estimates the channel conditions of all BSs in the active set of the MS. During uncertainty periods (e.g., during periods when fading is present), the method averages the channel conditions. One embodiment utilizes the measured pilot signal strengths to estimate the channel conditions of all BSs in the active set. The measured pilot strength is defined as the sum of all usable multipath signals. The measurement for these pilot signal strengths can be performed during each PCG to mitigate the detrimental effects of fading. After determining an estimation for the channel conditions of each BS in the active set, the method sorts the estimations in order of strength. After performing the STEP 310, the method proceeds to a decision STEP 320.

At the decision STEP 320 and STEP 330, the method determines whether the strongest pilot or set of pilots is greater than a selected threshold parameter, T_QOS_dB, wherein T_QOS_dB is an acronym for "target of quality of service measured in dB units" and is defined as a level of signal to noise ratio that can achieve a desired or required QoS. In one embodiment, a BS transmits the T_QOS_dB parameter. The T_QOS_dB parameter is defined by the following equation:

$$T\_QOS\_dB = FPC\_FCH\_SETPT + \Delta_\chi;$$

where $\Delta_\chi$ is a parameter dependent on the processing gain of data channel, coding rate, FPC accumulated gain, and other similar variables; and "FPC_FCH_SETPT" is an acronym for "forward power control fundamental channel set point" and is defined as a parameter for forward power control $E_b/N_t$ on the fundamental channel.

As shown in FIG. 3 at the decision STEP 320, if the strongest pilot is greater than the parameter T_QOS_dB, the method proceeds to a STEP 340, else the method proceeds to a STEP 330.

At the STEP 330, the MS selects additional pilot channel (s) until the following condition occurs:

SUM_PILOTS>T_QOS_dB;

wherein "SUM_PILOTS" is the combined received power from all received pilots from a desired set of base stations in the active set.

After the STEP 330, the method proceeds to the STEP 340.

At the STEP 340, the MS selects for transmission a desired set of base stations that are associated with the strong pilot channels (referred to hereinafter as the "desired set of BSs") during the time period defined by the term, $PCG_{N+2}$ (power control group), and gates off all remaining BSs in the active set during this time period. In one embodiment, a 1-bit field (e.g., the "gate_off_field") denotes whether a gate off (disable) or gate on (enable) condition is transmitted to each BS. For example, a message comprising a 1-bit GATE_OFF field can be set to a logical 1 and transmitted to each BS that is to be gated off. After the STEP 340, the method proceeds to a STEP 350.

At the STEP 350, the method transmits the identity of the desired set of BSs to all BSs in the active set of the selected MS. In one embodiment, the identity is transmitted using a low latency feedback channel that is time division multiplexed between all BSs in the MS active set. In one embodiment, the feedback channel has a length of 2 PCG or 400 Hz. In another embodiment, the feedback channel has a rate ranging between 200 Hz and 1600 Hz. Thus, the desired set of BSs can begin transmitting data during a specified time period. The specified time period can be determined by allowing a BS to transmit after waiting a defined time period, for example, after waiting a time period of $T_d$. In one embodiment, $T_d$ is specified in frames.

At the STEP 360, the MS assigns the bit positions in the feedback channel to each BS in the active set and performs a soft handoff procedure (SHO). In one embodiment, the MS transmits this position using the well-known *Handoff Completion Message*. In another embodiment, the BS bit position is associated with the PN_Pilot_Offse field of the handoff direction message. After the STEP 360, the method returns to the STEP 310.

The present inventive CSHO method regulates forward and reverse power control in the following manner. The forward power control can utilize the well-known forward power control techniques described in section 3.1.3.1.10 of the above-incorporated IS-2000. All BSs respond to the forward power control commands, however, only the desired set of BSs transmit information. In one embodiment, for reverse power control, the MS only responds to the reverse power control commands from the desired set of BSs. If there is more than one BS in the desired set of BSs, in order to implement reverse power control, the MS performs a conventional logical "OR" of the bits in the received power control commands. In another embodiment, all BSs in the active set (including the BSs whose traffic channels are gated off) continuously send reverse power control commands and the MS performs a conventional logical "OR" of the power control bits from all BSs.

Figure 4:
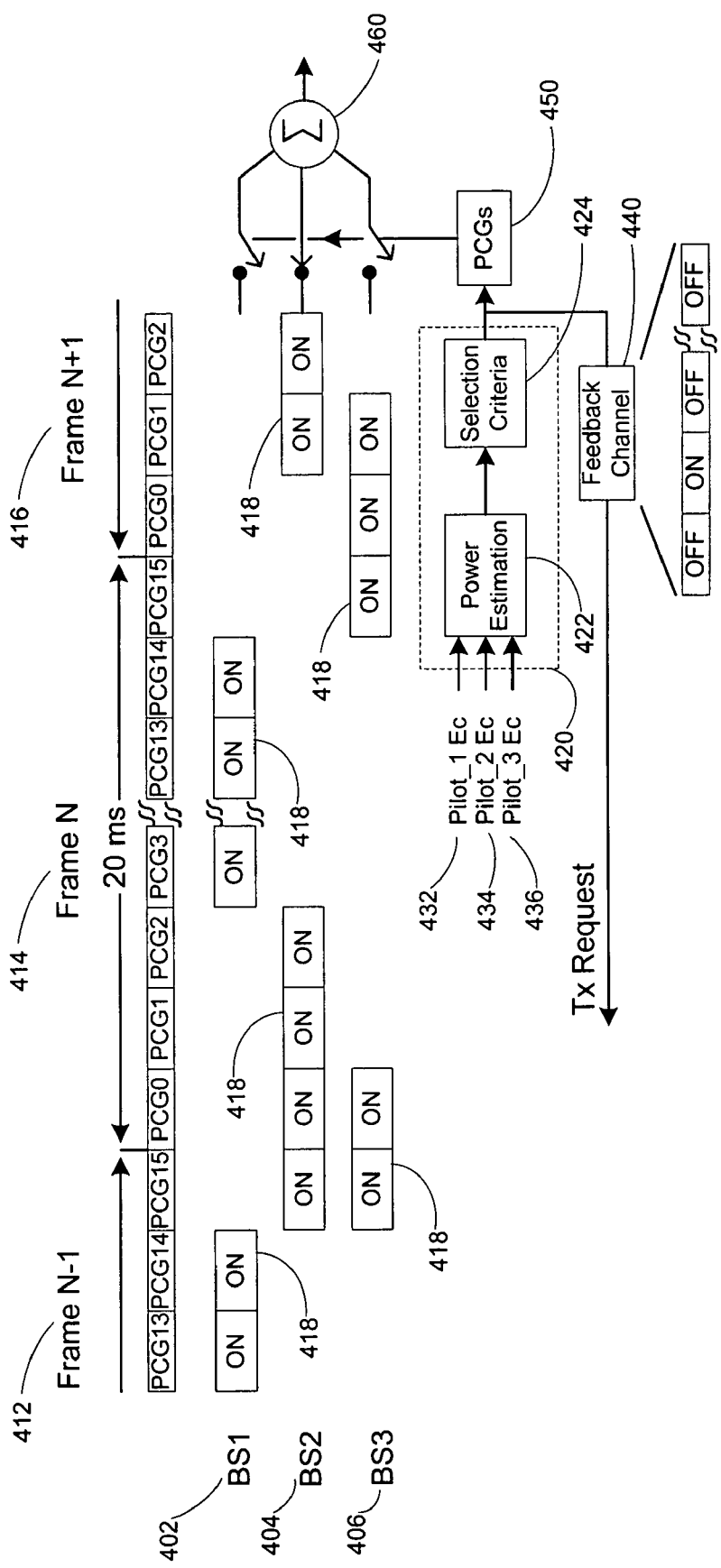
FIG. 4 shows a timeline of scheduled downlink transmissions using the exemplary voice only mode CSHO embodiment of the present invention.

To facilitate a better understanding of the present invention, a timeline of events and exchanges between MSs and BSs is now described with reference to FIG. 4. FIG. 4 shows a timeline showing scheduled downlink transmissions in an exemplary CSHO embodiment of the present invention. As shown in FIG. 4, three base stations 402, 404, and 406 are in the active set of a mobile station (MS) 420. The exemplary CSHO embodiment of the present invention uses a voice frame format wherein each voice frame 412, 414, and 416 has a duration of approximately 20 ms and includes 16 power control groups (PCG). Thus, a PCG has a duration of approximately 1.25 ms. The BSs 402, 404, and 406 transmit during specified time intervals or "PCGs". The "ON" boxes 418 shown in FIG. 4 represent the PCG time interval during which BSs are scheduled to transmit. For example, BS2 and BS3 are scheduled to transmit during the time interval "PCG0" of Frame "N 414".

In one embodiment, the exemplary CSHO method schedules BS transmissions based on energy/chip, or a "simple channel quality" (e.g., using the parameter "PILOT_n Ec"). As shown in FIG. 4, an MS (shown in the simplified block diagram of FIG. 4 as the MS Block 420) receives the energy/chip values 432, 434, and 436 for each BS. MS 420 includes a channel estimation device 422 and a selection criteria device 424. The channel estimation device 422 estimates the channel quality for each BS 402, 404, and 406 in the active set (i.e., BS1 402, BS2 404 and BS3 406). These channel quality estimations are input to the selection criteria device 424 where a BS or set of BSs are selected to be allowed to transmit during a specified time interval (i.e., during a specified PCG). Information regarding the desired set of BSs is transmitted to a PCG delay device 450 and the BSs 402, 404, and 406 using a feedback channel 440. Thus, BSs can determine when to transmit and when to gate off. The PCG delay device 450 aids in time-synchronizing a summer device 460. The summer device 460 is a maximum ratio combiner (MRC) that sums the energy from all of the transmitting BSs before channel symbols are input to a decoder (not pictured).

In summary, the cell selection handoff method and apparatus of the present invention identifies transmitters to disable or gate off during soft handoff procedures. The method and apparatus of the present invention monitors channel conditions for all base stations in an active set and determines the relative strengths of base stations based on the monitored channel conditions. Two embodiments of the present invention have been described.

The method and apparatus of the present invention reduces interference in wireless communication systems. Specifically, the present invention temporarily disables, or "gates off" selected transmitters (e.g., base stations) during a soft handoff to an associated receiver (e.g., mobile station), and thus reduces interference to non-associated receivers. Reducing interference increases voice and/or data capacity in a wireless communication system, while maintaining a desired QoS.

A number of embodiments of the present invention have been described. Nevertheless, it will be understood that various modifications may be made without departing from the spirit and scope of the invention. For example, the methods of the present invention can be executed by software or hardware, and can be performed within the active set base stations, or within the mobile stations.

Accordingly, it is to be understood that the invention is not to be limited by the specific illustrated embodiment, but only by the scope of the appended claims.

What is claimed is:

1. A method of performing cell selection handoffs in a wireless communication system, wherein the wireless communication system includes a plurality of base stations in communication with a mobile station (MS), wherein the base stations transmit information to the mobile station via a forward link, and wherein the base stations receive information from the mobile station via a reverse link, and wherein each base station is capable of gating off transmissions for selected time intervals, and wherein the mobile station is capable of determining a strongest base station, and wherein the MS has an associated and corresponding active set of base stations comprising base stations with which the MS currently communicates, and wherein the communication system is capable of performing soft handoffs, comprising the steps of:

a) determining a desired set of base stations, wherein the determining step comprises:

(i) obtaining a threshold parameter based upon receiver needs for proper reception, wherein the threshold is dependent upon a minimum of MS received power that is necessary to achieve a desired Quality of Service (QoS) for the MS, (ii) determining relative base station signal strength for each base station in the active set, and (iii) selecting a minimum number of relatively strong base stations from the active set required to provide the minimum of MS received power to the MS, wherein a combined signal strength of the selected strong base stations are compared with the threshold, and wherein additional strong base stations are selected from the active set until the combined signal strength exceeds the threshold;

b) temporarily gating off all base stations except for the desired set of base stations determined during step (a) for a selected time interval; and c) performing a soft handoff.

2. The method of performing cell selection handoffs as defined in claim 1, wherein the selected time interval comprises a Power Control Group (PCG) time slot.

3. The method of performing cell selection handoffs as defined in claim 1, wherein the step (a) includes determining a set of strong base stations on a Power Control Group ("PCG") basis.

4. The method of performing cell selection handoffs as defined in claim 1, wherein the selected time interval comprises approximately 1.25 milliseconds.

5. The method of performing cell selection handoffs as defined in claim 1, wherein the step (a) includes the following sub-steps:

i) measuring carrier-to-interference ratios of all of the base stations in the active set; and ii) selecting a base station having a best signal to noise ($E_b/N_t$) to achieve the desired QoS to be a selected base station of the desired set of base stations.

6. The method of performing cell selection handoffs as defined in claim 1, wherein the step (a) is performed by a mobile station.

7. The method of performing cell selection handoffs as defined in claim 1, wherein the step (a) includes the following sub-steps:

i) measuring a plurality of received pilot $E_c/I_o$ values that represents a pilot $E_c/I_o$ for each pilot in the mobile station active set;

ii) averaging the plurality of received pilot $E_c/I_o$ values; and iii) selecting a base station having a best pilot $E_c/I_o$ value to be a selected base station of the desired set of base stations.

8. The method of performing cell selection handoffs as defined in claim 7, wherein the averaging sub-step (ii) is implemented by hardware.

9. The method of performing cell selection handoffs as defined in claim 7, wherein the averaging sub-step (ii) is implemented by software.

10. The method of performing cell selection handoffs as defined in claim 7, wherein the averaging sub-step (ii) is performed by a filter.

11. The method of performing cell selection handoffs as defined in claim 10, wherein the averaging sub-step (ii) is performed by an IIR filter.

12. The method of performing cell selection handoffs as defined in claim 10, wherein the averaging sub-step (ii) is performed by an FIR filter.

13. The method of performing cell selection handoffs as defined in claim 1, wherein the step (b) comprises transmitting a gate off message to all base stations in the mobile station active set except for the desired set of base stations.

14. The method of performing cell selection handoffs as defined in claim 13, wherein the gate off message is transmitted via a feedback channel.

15. The method of performing cell selection handoffs as defined in claim 14, wherein the feedback channel has a length of one to several Power Control Groups ("PCGs").

16. The method of performing cell selection handoffs as defined in claim 14, wherein the feedback channel has a rate ranging between 200 Hz and 1600 Hz.

17. The method of claim 14, wherein the feedback channel comprises a low latency feedback channel having relatively short transmission delays.

18. The method of performing cell selection handoffs as defined in claim 1, wherein the step (a) comprises the following sub-steps:
 i) continuously determining channel condition estimate for each base station in the mobile station active set;
 ii) continuously sorting the channel condition estimates by strength; and
 iii) continuously determining whether a strongest channel condition estimate is greater than the threshold parameter.

19. The method of performing cell selection handoffs as defined in claim 18, wherein the determining sub-step (i) utilizes a sum of all usable multipath signals to estimate channel conditions.

20. The method of performing cell selection handoffs as defined in claim 18, wherein the estimating sub-step (i) averages the continuous channel condition estimate during uncertainty periods.

21. The method of performing cell selection handoffs as defined in claim 18, wherein the threshold parameter of the determining sub-step (iii) is defined by the following equation:

$$T\_QOS\_dB = FPC\_FCH\_SETPT + \Delta_x.$$

22. The method of performing cell selection handoffs as defined in claim 21, wherein the determining sub-step (iii) further comprises selecting additional continuous channel condition estimates until a combination of strong continuous channel condition estimates is greater than the threshold parameter.

23. The method of performing cell selection handoffs as defined in claim 21, wherein the determining sub-step (iii) further comprises selecting additional continuous channel condition estimates until SUM_PILOTS>T_QOS_dB occurs, where SUM_PILOTS is a combined received power from all received pilots from a desired set of base stations in the mobile station active set.

24. The method of performing cell selection handoffs as defined in claim 1, wherein the step (b) comprises the following sub-steps:
 i) selecting a desired set of base stations to transmit during a Power Control Group ("PCG") $PCG_{N+2}$; and
 ii) gating off all remaining BSs in the active set.

25. The method of claim 1, wherein the desired set of base stations comprises only one base station.

26. Apparatus for performing cell selection handoff functions in a wireless communication system, wherein the wireless communication system includes a plurality of base stations in communication with a mobile station (MS), wherein the base stations transmit information to the mobile station via a forward link, and wherein the base stations receive information from the mobile station via a reverse link, and wherein each base station is capable of gating off transmissions for selected time intervals, and wherein the mobile station is capable of determining a strongest base station, and wherein the MS has an associated and corresponding active set of base stations comprising base stations with which the MS currently communicates, and wherein the communication system is capable of performing soft handoffs, comprising:
 a) a base station selection module configured to determine a desired set of base stations by comparing a sum of strengths of one or more base station signals received by the mobile station to a threshold parameter, the threshold parameter being based upon requirements for proper reception by the mobile station, wherein the threshold is dependent upon a minimum of MS received power that is necessary to achieve a desired Quality of Service (QoS) for the MS, and wherein the selection module selects a minimum number of relatively strong base stations from the MS active set required to provide the minimum of MS received power to the MS;
 b) a forward link instruction module configured to prepare instructions for temporarily gating off selected base stations for a selected time interval based on the desired set of base stations determined by the base station selection module; and
 c) a soft handoff control module configured to enable, after temporarily gating off the selected base stations, performance of the cell selection soft handoff functions.

27. A computer program executable on a computing device, wherein the program is capable of directing performance of cell selection handoff functions in a wireless communication system, wherein the wireless communication system includes a plurality of base stations in communication with a mobile station, wherein the base stations transmit information to the mobile station via a forward link, and wherein the base stations receive information from the mobile station via a reverse link, and wherein each base station is capable of gating off transmissions for selected time intervals, and wherein the mobile station is capable of determining a strongest base station, and wherein the MS has an associated and corresponding active set of base stations comprising base stations with which the MS currently communicates, and wherein the communication system is capable of performing soft handoffs, comprising:
 a) a first set of instructions for determining a desired set of base stations by comparing a sum of strengths of one or more base station signals received by the mobile station to a threshold parameter, the threshold parameter being based upon requirements for proper reception by the mobile station, and wherein the threshold is dependent upon a minimum of MS received power necessary to achieve a desired Quality of Service (QoS) for the MS, and wherein the desired set comprises a minimum number of relatively strong base stations from the MS active set having a combined received signal strength that exceeds the threshold;
 b) a second set of instructions for temporarily gating off all base stations except for the desired set of base stations for a selected time interval; and
 c) a third set of instructions for directing performance of soft handoff functions after completion of the first and second sets of instructions.

* * * * *